(12) United States Patent
Le Roy et al.

(10) Patent No.: US 10,217,498 B2
(45) Date of Patent: Feb. 26, 2019

(54) TECHNIQUES FOR PREVENTING TAMPERING WITH PROM SETTINGS

(71) Applicant: QUALCOMM Incorporated, San Diego, CA (US)

(72) Inventors: Vincent Pierre Le Roy, San Diego, CA (US); Bhadri Kubendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 241 days.

(21) Appl. No.: 15/262,417

(22) Filed: Sep. 12, 2016

(65) Prior Publication Data

US 2018/0075888 A1    Mar. 15, 2018

(51) Int. Cl.
| | | |
|---|---|---|
| G06F 21/00 | (2013.01) |
| G11C 7/24 | (2006.01) |
| G06F 7/58 | (2006.01) |
| G11C 5/14 | (2006.01) |
| G11C 7/20 | (2006.01) |
| G11C 7/22 | (2006.01) |
| G06F 21/79 | (2013.01) |
| H04L 9/00 | (2006.01) |
| G09C 1/00 | (2006.01) |
| G06F 21/57 | (2013.01) |

(52) U.S. Cl.
CPC .............. G11C 7/24 (2013.01); G06F 7/582 (2013.01); G06F 21/79 (2013.01); G09C 1/00 (2013.01); G11C 5/148 (2013.01); G11C 7/20 (2013.01); G11C 7/22 (2013.01); H04L 9/004 (2013.01); *G06F 7/58* (2013.01); *G06F 21/575* (2013.01); *H04L 2209/08* (2013.01)

(58) Field of Classification Search
CPC .............................. G06F 7/582; G11C 5/148
See application file for complete search history.

(56) References Cited

U.S. PATENT DOCUMENTS

| | | | |
|---|---|---|---|
| 5,452,355 A | * | 9/1995 | Coli ....................... G06F 21/75 380/277 |
| 5,729,766 A | | 3/1998 | Cohen |
| 7,752,465 B2 | | 7/2010 | Ebringer et al. |
| 8,884,757 B2 | | 11/2014 | Sasson et al. |
| 8,930,739 B2 | | 1/2015 | Kim et al. |
| 9,912,475 B2 | * | 3/2018 | Schmidt ................ H04L 9/0861 |

(Continued)

FOREIGN PATENT DOCUMENTS

JP    2001075942 A    3/2001

OTHER PUBLICATIONS

International Search Report and Written Opinion—PCT/US2017/050180—ISA/EPO—dated Dec. 1, 2017.

(Continued)

*Primary Examiner* — Ali Shayanfar
(74) *Attorney, Agent, or Firm* — Hunter Clark PLLC

(57) ABSTRACT

Techniques for preventing tampering with programmable read-only memory of an integrated circuit are provided. A method according to these techniques includes performing a randomized read of data stored in the programmable read-only memory based on an input from an entropy source, writing the data to one or more registers of the integrated circuit, and initializing one or more components of the integrated circuit using the data stored in the one or more registers.

27 Claims, 8 Drawing Sheets

(56) References Cited

U.S. PATENT DOCUMENTS

| | | | | |
|---|---|---|---|---|
| 2001/0054163 | A1* | 12/2001 | Teglia | G06F 21/6218 |
| | | | | 714/702 |
| 2005/0128093 | A1* | 6/2005 | Genova | G08B 17/12 |
| | | | | 340/577 |
| 2008/0046216 | A1* | 2/2008 | Thomas | H04L 9/002 |
| | | | | 702/179 |
| 2009/0208014 | A1* | 8/2009 | Betouin | G06F 7/58 |
| | | | | 380/277 |
| 2012/0239368 | A1* | 9/2012 | Agmon | G06F 17/5022 |
| | | | | 703/13 |
| 2013/0007081 | A1* | 1/2013 | Lee | G06F 7/584 |
| | | | | 708/250 |
| 2013/0007881 | A1* | 1/2013 | Liem | G06F 21/14 |
| | | | | 726/22 |
| 2013/0073598 | A1* | 3/2013 | Jacobson | G06F 7/588 |
| | | | | 708/252 |
| 2014/0208177 | A1* | 7/2014 | Parekhji | G01R 31/318544 |
| | | | | 714/729 |
| 2014/0254234 | A1* | 9/2014 | Sandri | G11C 17/16 |
| | | | | 365/96 |
| 2015/0106952 | A1* | 4/2015 | Bacher | G06F 21/60 |
| | | | | 726/26 |
| 2016/0078240 | A1 | 3/2016 | Kang et al. | |
| 2018/0024920 | A1* | 1/2018 | Thomas | G06F 12/0246 |

OTHER PUBLICATIONS

Rankl W., et al., "Smart Card Handbook, 4th Edition", In: "Smart Card Handbook, 4th Edition", 2010, Wiley, Chichester, West Sussex, U.K, XP055428390, ISBN: 978-0-470-74367-6, pp. 706-711.

* cited by examiner

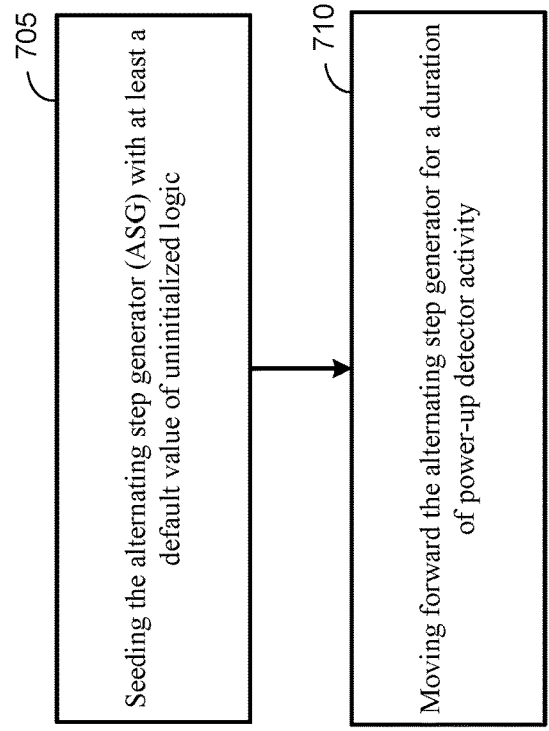
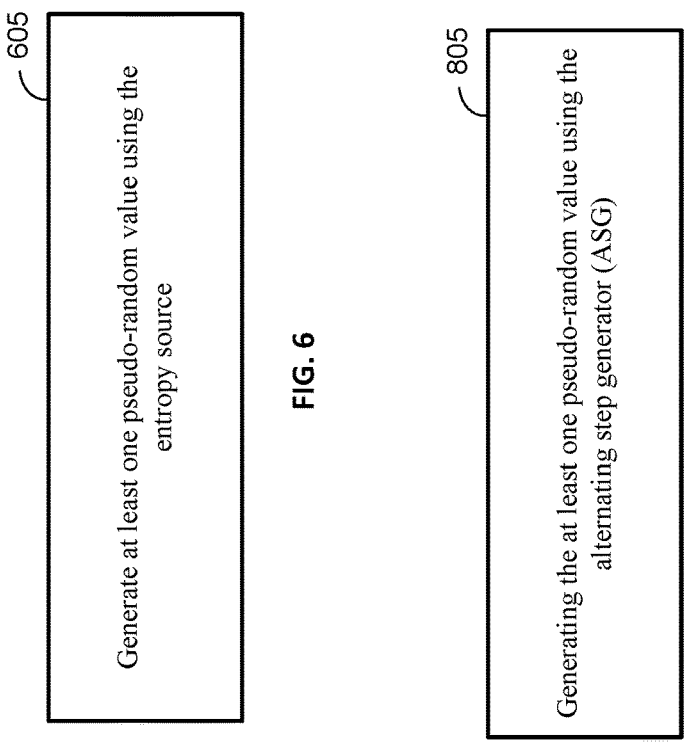

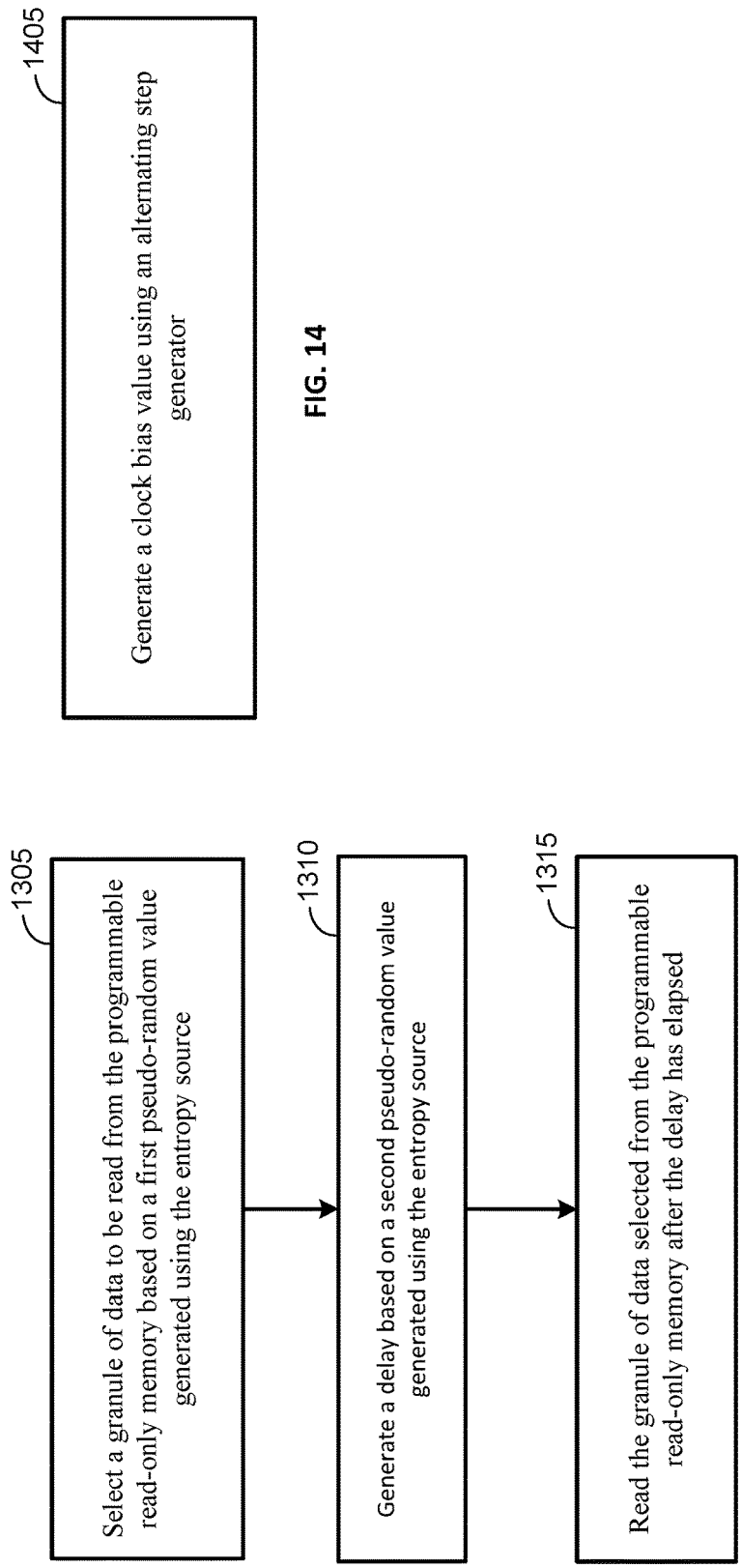

TECHNIQUES FOR PREVENTING TAMPERING WITH PROM SETTINGS

BACKGROUND

Many integrated circuits (ICs) include programmable read-only memory (PROM) which serves as a persistent, one-time programmable memory that can be used to store data that may be used by the IC at the time that the device is booted up. The PROM can be used to store information that needs to be accessed by the hardware prior to the IC being ready to execute program code and can include sensitive information such as cryptographic keys, life-cycle management states, calibrations, configuration data, and other sensitive information. The PROM can be used to store persistent configuration and/or calibration data that can be read (also referred to herein as "sensed") from the PROM at the time that the integrated circuit is reset or rebooted. At the time that the IC is booted, the hardware typically reads the contents of the PROM sequentially and shadows the contents into one or more registers of the processor of the IC. An attacker may attempt to tamper with the PROM values stored in the one or more registers of the processor to alter the behavior of the IC. Conventional approaches to protecting PROM settings typically rely on redundancy and sensors to protect the PROM sensing. For example, Forward Error Correction (FEC) or parity bits may be used to provide redundancy to ensure that the data read from the PROM has not been tampered with, and sensors such as voltage, temperature, and light sensors may be used to detect tampering with the IC. However, the use of sensors may be limited where the sensors require calibration values that are stored in the PROM or need to be enabled by software executed by the processor of the IC.

SUMMARY

A method for preventing tampering with programmable read-only memory of an integrated circuit according to the disclosure includes performing a randomized read of data stored in the programmable read-only memory based on an input from an entropy source, writing the data to one or more registers of the integrated circuit, and initializing one or more components of the integrated circuit using the data stored in the one or more registers.

Implementations of such a method can include one or more of the following features. Determining whether the data stored in the programmable read-only memory needs to be read in a particular order, performing a preliminary read of the data stored in the programmable read-only memory in the particular order prior to performing the randomized read of the data, comparing data read in the randomized read to the data read in the preliminary read, and aborting initialization of the integrated circuit responsive to the data read in the randomized read not matching the data read in the preliminary read. Generating at least one pseudo-random value using the entropy source. The entropy source comprises a default value of uninitialized logic. The uninitialized logic comprises a plurality of non-resettable flip flops. The entropy source further comprises a mechanism to compensate for process biasing. The mechanism comprises an LFSR-based power up detector associated with an alternating step generator. Seeding the alternating step generator with a default value of uninitialized logic, and moving forward the alternating step generator for a duration of power-up detector activity. Generating the at least one pseudo-random value using the alternating step generator. Performing the randomized read of the data stored in the programmable read-only memory based on the input from the entropy source is performed responsive to the integrated circuit being powered up, and the entropy source is not dependent upon the data stored in the programmable read-only memory while performing the randomized read of the programmable read-only memory responsive to the integrated circuit being powered up. Performing a subsequent randomized read of the data stored in the programmable read-only memory based on a second input from a second entropy source, and the second entropy source utilizing the data stored in the programmable read-only memory when generating the second input. Performing the randomized read of the data stored in the programmable read-only memory based on the input from the entropy source includes selecting a granule of data to be read from the programmable read-only memory based on a first pseudo-random value generated using the entropy source, and reading the granule of data selected from the programmable read-only memory. The granule of data comprises at least one bit of data. Performing the randomized read of the data stored in the programmable read-only memory based on the input from the entropy source includes selecting a granule of data to read from the programmable read-only memory, generating a delay based on a second pseudo-random value generated using the entropy source, and reading the granule of data selected from the programmable read-only memory after the delay has elapsed. Performing the randomized read of the data stored in the programmable read-only memory based on the input from the entropy source includes selecting a granule of data to be read from the programmable read-only memory based on a first pseudo-random value generated using the entropy source, generating a delay based on a second pseudo-random value generated using the entropy source, and reading the granule of data selected from the programmable read-only memory after the delay has elapsed. Generating the delay based on the second pseudo-random value includes generating a clock bias value using an alternating step generator.

An apparatus according to the disclosure includes a programmable read-only memory and a processor. The processor is coupled to the programmable read-only memory, the processor being configured to: perform a randomized read of data stored in the programmable read-only memory of an integrated circuit based on an input from an entropy source, write the data to one or more registers of the integrated circuit, and initialize one or more components of the integrated circuit using the data stored in the one or more registers.

Implementations of such an apparatus can include one or more of the following features. The processor is further configured to determine whether the data stored in the programmable read-only memory needs to be read in a particular order, perform a preliminary read of the data stored in the programmable read-only memory in the particular order prior to performing the randomized read of the data, compare data read in the randomized read to the data read in the preliminary read, and abort initialization of the integrated circuit responsive to the data read in the randomized read not matching the data read in the preliminary read. The processor is further configured to generate at least one pseudo-random value using the entropy source. The entropy source comprises a default value of uninitialized logic. The uninitialized logic comprises a plurality of non-resettable flip flops. The processor is configured to perform the randomized read of the data stored in the programmable read-only memory based on the input from the entropy source responsive to the integrated circuit being powered up, and the entropy source is not dependent upon the data stored in the programmable read-only memory while performing the randomized read of the programmable read-only memory responsive to the integrated circuit being powered up. The processor is configured to perform a subsequent randomized read of the data stored in the programmable read-only memory based on a second input from a second entropy source, and the second entropy source is configured to utilize the data stored in the programmable read-only memory when generating the second input. The processor being configured to perform the randomized read of the data stored in the programmable read-only memory based on the input from the entropy source is further configured to select a granule of data to be read from the programmable read-only memory based on a first pseudo-random value generated using the entropy source, and read the granule of data selected from the programmable read-only memory. The processor being configured to perform the randomized read of the data stored in the programmable read-only memory based on the input from the entropy source is further configured to select a granule of data to read from the programmable read-only memory, generate a delay based on a second pseudo-random value generated using the entropy source, and read the granule of data selected from the programmable read-only memory after the delay has elapsed. The processor being configured to perform the randomized read of the data stored in the programmable read-only memory based on the input from the entropy source is further configured to select a granule of data to be read from the programmable read-only memory based on a first pseudo-random value generated using the entropy source, generate a delay based on a second pseudo-random value generated using the entropy source, and read the granule of data selected from the programmable read-only memory after the delay has elapsed.

An apparatus according to the disclosure includes means for performing a randomized read of data stored in programmable read-only memory of an integrated circuit based on an input from an entropy source, means for writing the data to one or more registers of the integrated circuit; and means for initializing one or more components of the integrated circuit using the data stored in the one or more registers.

Implementations of such an apparatus can include one or more of the following features. Means for determining whether the data stored in the programmable read-only memory needs to be read in a particular order, means for performing a preliminary read of the data stored in the programmable read-only memory in the particular order prior to performing the randomized read of the data, means for comparing data read in the randomized read to the data read in the preliminary read, and means for aborting initialization of the integrated circuit responsive to the data read in the randomized read not matching the data read in the preliminary read. Means for generating at least one pseudo-random value using the entropy source. The entropy source comprises a default value of uninitialized logic. The uninitialized logic comprises a plurality of non-resettable flip flops.

BRIEF DESCRIPTION OF THE DRAWINGS

FIG. 6 is a flow diagram of an example process for generating at least one pseudo-random value using an entropy source according to the techniques disclosed herein.

FIG. 7 is a flow diagram of an example process for generating at least one pseudo-random value using an alternating step generator according to the techniques disclosed herein.

FIG. 8 is a flow diagram of an example process for generating at least one pseudo-random value using an alternating step generator according to the techniques disclosed herein.

FIG. 13 is a flow diagram of an example process for performing a randomized read of the data stored in the programmable read-only memory according to the techniques disclosed herein according to the techniques disclosed herein.

FIG. 14 is a flow diagram of an example process for generating a delay using an alternating step generator according to the techniques disclosed herein.

DETAILED DESCRIPTION

Techniques for preventing tampering with settings for an integrated circuit stored in the programmable read-only memory (PROM) of the integrated circuit are provided. The PROM of the integrated circuit can be used to store persistent configuration and/or calibration data that can be read (also referred to herein as "sensed") from the PROM at the time that the integrated circuit is reset or rebooted. These techniques include introducing randomization as the data is read from the PROM to prevent tampering with the data and render attacks to the integrated circuit to obtain and/or alter such data to be non-deterministic. The data being read from the PROM may be read into one or more registers (also referred to herein as "sense registers") from which one or more components of the integrated circuit may then utilize the data. The randomization can be temporal. Delays of random lengths can be introduced into the read process to disguise at what time a particular piece of data from the PROM. The randomization can also include permuting the order in which the data is read from the PROM, such that the data is not read in the same order each time that the data is read. These techniques can help to prevent data from being tampered with as the data is copied from the PROM to the one or more sense registers. These techniques do not require the redundancy and/or the sensors of the conventional approaches discussed above.

Figure 1:
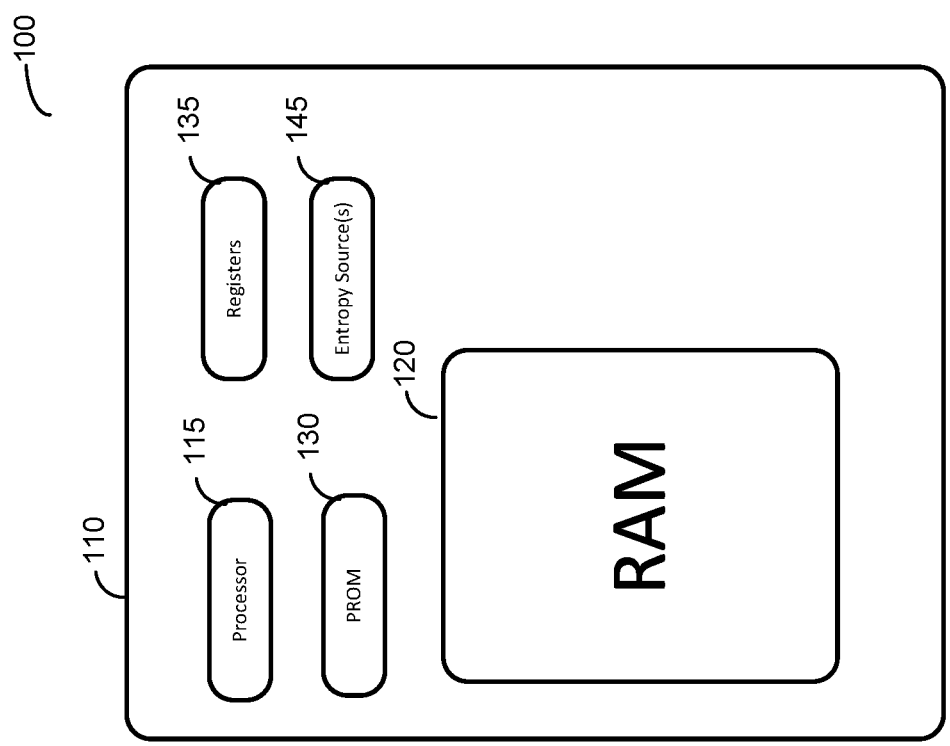
FIG. 1 is a functional block diagram of an example computing device that can be used to implement the techniques disclosed herein.

FIG. 1 is a functional block diagram of an example computing device 100 that can be used to implement the techniques disclosed herein. The computing device 100 includes an integrated circuit 110. The integrated circuit can be a system on a chip (SoC) or other similar device that integrates components of a computing device on an integrated circuit. The computing device 100 can include a processor 115, programmable read-only memory (PROM) 130, one or more registers 135, one or more entropy sources 145, and volatile memory 120.

The processor 115 is a physical processor (i.e., physical components of the integrated circuit configured to execute operations on the computing device 100 as specified by software and/or firmware). The processor 115 can be an intelligent hardware device, e.g., a central processing unit (CPU), one or more microprocessors, a controller or microcontroller, an application specific integrated circuit (ASIC), a general-purpose processor, a digital signal processor (DSP), a field programmable gate array (FPGA) or other programmable logic device, a state machine, discrete gate or transistor logic, discrete hardware components, or any combination thereof designed to perform the functions described herein and operable to carry out instructions on the computing device 100. The processor 115 can be one or more processors.

The PROM 130 comprises a persistent memory that retains the data stored therein even if power to the computing device 100 is lost. The PROM 130 can comprise a plurality of fuses that each represent a bit of data, and the value of a particular bit can be set by blowing the corresponding fuse. The value of a fuse, once set, cannot be changed. The value of the fuse in its original state may be used to represent a bit value of zero ('0'), and the value of the fuse once blown may be used to represent a bit value of one ('1'). In other embodiments, the value of the fuse in its original state may be used to represent a bit value of one ('1'), and the value of the fuse once blown may be used to represent a bit value of one ('0'). Furthermore, other types of PROM 130 may be used. For example, the PROM 130 may comprise anti-fuses instead of fuses. The PROM 130 can be used to store persistent data used by the integrated circuit 110 during the boot process. The data stored by the PROM 130 can include sensitive information such as cryptographic keys, life-cycle management states, calibrations, and other sensitive information.

The one or more registers 135 comprise a fast storage that can be used by the processor 115 to store data that may be used by the processor 115 and/or one or more other components of the integrated circuit 110. The processor 115 can be configured to store data read from the PROM 130 in the one or more registers 135 during the boot up or startup process of the IC.

The one or more entropy sources 145 can be used to provide randomization inputs that can be used to introduce randomization into the reads of the data from the PROM 130. The randomization can be temporal randomization and/or relating to the order in which data is read from the PROM 130. Temporal randomization can include introducing delays of a random length between reads of data from the PROM 130. The order in which the data is read can also be randomized rather than reading the data from the PROM 130 sequentially.

The volatile memory 120 can comprise memory that is configured to maintain the data stored therein while power is provided to the volatile memory 120. The contents of the volatile memory 120 will be lost if the power supply to the computing device 100 is lost.

Figure 2:
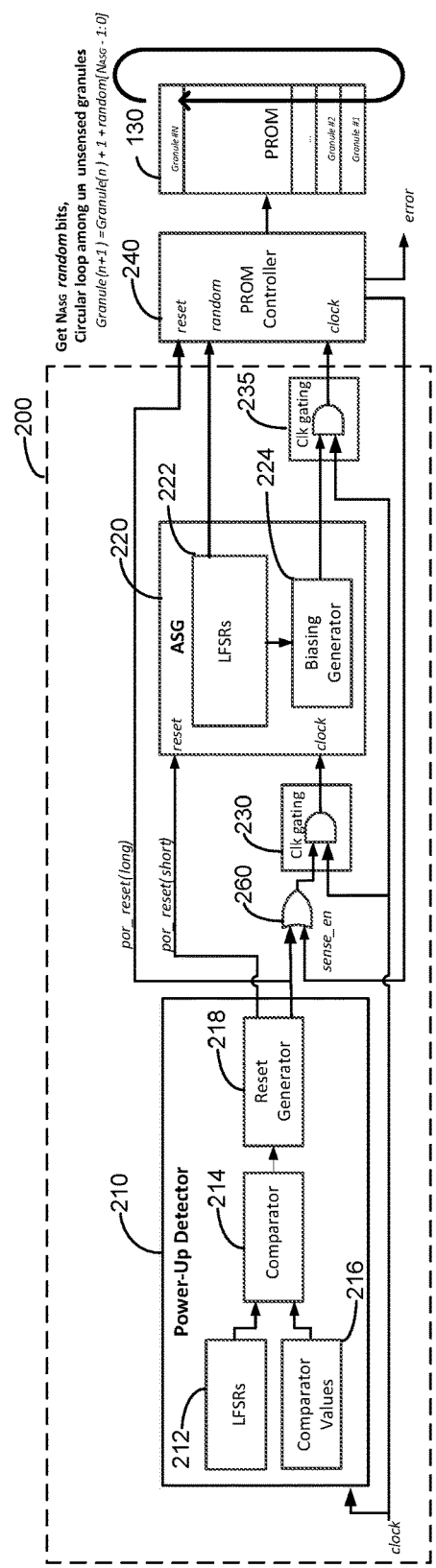
FIG. 2 is a functional block diagram of an example entropy source that can be implemented in the computer system illustrated in FIG. 1.

FIG. 2 is a functional block diagram of an example entropy source 200 that can be implemented in the computer system illustrated in FIG. 1. The entropy source 200 can be used to implement, at least in part, the entropy sources 145 illustrated in FIG. 1. The entropy source 200 includes a power-up detector (PUD) 210 and an alternating step generator (ASG) 220. While the example entropy source 200 illustrated in FIG. 2 includes both a PUD 210 and an ASG 220, other implementations of an entropy source may omit one or both of these component and/or may include additional components in addition to or instead of one of these components. The entropy source 200 does not need to be cryptographically strong to introduce a sufficient amount of randomness into the process of sensing the data stored in the PROM 130. Because the sensing process reads the data from the PROM 130, it may not be possible to include a true random number generated (RNG) or other cryptographically strong entropy source in the entropy source 200. A true RNG typically or other such entropy source typically requires software initialization, calibration or configuration values stored in the PROM 130, or both, which are unavailable prior to the PROM 130 sensing. The PUD 210 and the ASG 220 have been selected as entropy sources, because they do not depend on calibration or configuration data stored in the PROM 130, nor do the PUD 210 or the ASG 220 require software configuration. Thus, the PUD 210 and the ASG 220 can introduce randomness into the PROM sensing process without prior initialization.

The PUD 210 can be configured to generate a power-up detected signal in response to a power up event of the integrated circuit 110. The PUD 210 can be configured to generate the signal within a bounded minimum and bounded maximum time, and as such, can provide an entropy input that can be used to determine delays and/or permutation of the order of the data to be read from the PROM 130. The PUD 210 can comprise a plurality of linear-feedback shift registers (LFSRs) 212, and each of the LFSRs 212 can be configured to cycle through a sequence of states where each state is determined as a linear function of the prior state. Each of the LFSRs 212 may start at a random or pseudorandom state upon power up of the integrated circuit 110 and can be configured to operate substantially in parallel, transitioning from state to state once initialized. The PUD 210 can include a comparator unit 214. The comparator unit 214 can be configured to receive an output from each of the LFSRs 212 and to compare the output to a predetermined value for each LFSR or a predetermined state value for all or a subset of the LFSRs. The comparator unit 214 can be configured to keep track of when each of the LFSRs reaches the state represented by the predetermined value. The predetermined value or values can be stored in the comparator values 216 of the PUD 210. Once all of the LFSRs (or a predetermined threshold number of LFSRs) reach the state presented by the predetermined value, the comparator unit 214 can be configured to output a signal to the reset generator 218. The reset generator 218 can be configured to output a signal or signals that can be received by the ASG 220 and the PROM controller 240. Outputting the signal can include transitioning from a low logic level to a high logic level or vice versa. The PUD 210 can be implemented using the power on reset circuit described in U.S. Pat. No. 8,493, 109. The PUD 210 can also be implemented using other configurations. The initial value of the LFSRs 212 can be seeded using the output of one or more D flip-flops (DFFs) to provide the seed value to the each of the LFSRs 212.

The sense enable unit 260 is configured to receive a reset signal output by the reset generator 218 of the PUD 210 and a signal output by the PROM controller 240 as inputs. If either signal is asserted (e.g. high) the sense enable unit 260 outputs a signal indicating that the PROM sensing is enabled.

The clock gating unit 230 is configured to receive as inputs a clock signal generated by a clock generator of the integrated circuit 110 and the signal output by the sense enable unit 260. The clock signal is used to coordinate the actions of the processor 115 and other components of the integrated circuit 110. The clock gating unit 230 is configured to propagate the clock signal when the sense enable signal is asserted. The output of the clock gating unit 230 is provided as a clock input to the ASG 220.

The ASG 220 is configured to serve as a pseudorandom number generator. The ASG 220 can be configured to receive the reset signal output by the PUD 210. The reset signal can be used to ensure a non-zero initialization of the ASG 220. The ASG 220 can be used to maintain entropy where more than one read of the PROM 130 is performed during the same power cycle by ensuring that the same random/pseudo-random value is not used more than once in the same power cycle of the integrated circuit 110. The ASG 220 can comprise a plurality of LFSRs 222 and a biasing generator 224. In one example implementation, the ASG 220 comprises three LSFRs: LSRF0, LSFR1, and LSFR2. The output from a respective one of the LSFRS can determine the output of one of the other two LSFRs to be output by the LFSRs 222. The output is the exclusive OR of the last bit produced by the other two LSFRs. The output from the LFSRs 222 can be input to the biasing generator 224. The biasing generator 224 is also configured to receive the clock input output by the clock gating unit 230. The biasing generator 224 can be configured to insert delays having a pseudo-random length based on the output of the LFSRs 222 into the clock signal received at the biasing generator 224.

The clock gating unit 235 is configured to receive as an input the clock signal generated by the clock generator of the integrated circuit 110. The clock gating unit 235 also receives a clock signal output by the ASG 220. The clock gating unit 235 is configured to propagate the clock signal responsive to the signal output by the ASG 220 being asserted. The output of the clock gating unit 230 is provided as a clock input to the ASG 220. The output of the clock gating unit 235 serves as a clock input to the PROM controller 240.

The PROM 130 can be subdivided into "granules" comprising one or more contiguous bits of data stored in the PROM 130. The PROM controller 240 can be configured to randomize the order in which the granules are sensed or read from the PROM 130. The PROM controller 240 can be configured to determine which granule of data to be read next from the PROM 130 based on the reset signal output by the PUD 210 and/or the pseudorandom value output by the ASG 220. In the example implementation of FIG. 2, the ASG 220 is cycled for the duration of the PUD 210, which is of a pseudo-random duration. PROM controller 240 is configured to receive an input from the clock gating unit 235. The clock signal input to the PROM controller 240 can be gated to introduce delays into when the next granule of data is to be read from the PROM 130. In some implementations, the integrated circuit 110 can be configured to power up with a reset condition which can trigger the clock or clocks of the integrated circuit 110 to being operating in a free-running state. The reset condition can de-assert and can trigger a finite state machine (FSM), which can in turn trigger the PROM controller 240 to begin sensing from the PROM 130. The FSM in the example implementation illustrated in FIG. 2 can be the entropy sources 145 or entropy source 200, which can be triggered by the clock signal. In other implementations, the processor 115 can be configured to asset as signal to trigger the PROM controller 240 begin reading the data from the PROM 130.

The entropy source 200 can also include a secondary entropy source that requires configuration data, calibration data, or software initialization. Such an entropy source can be used for subsequent reads of the data stored in the PROM 130 after the initial randomized read of the data from the PROM 130 has occurred and one or more components of the integrated circuit have already been initialized.

The use of both the PUD 210 and the ASG 220 protect against process biasing which could reduce the entropy of the system and make it easier for an attacker to thwart the protections provided by the entropy source 200. The ASG 220 also provides for functional biasing. Without such functional biasing, the ASG 220 may generate either a 1 or a 0 output with a probability of 50% each. The introduction of the functional biasing can be used to tune the level of gated clock pulses, which translates into time variation in the downstream logic.

Figure 3:
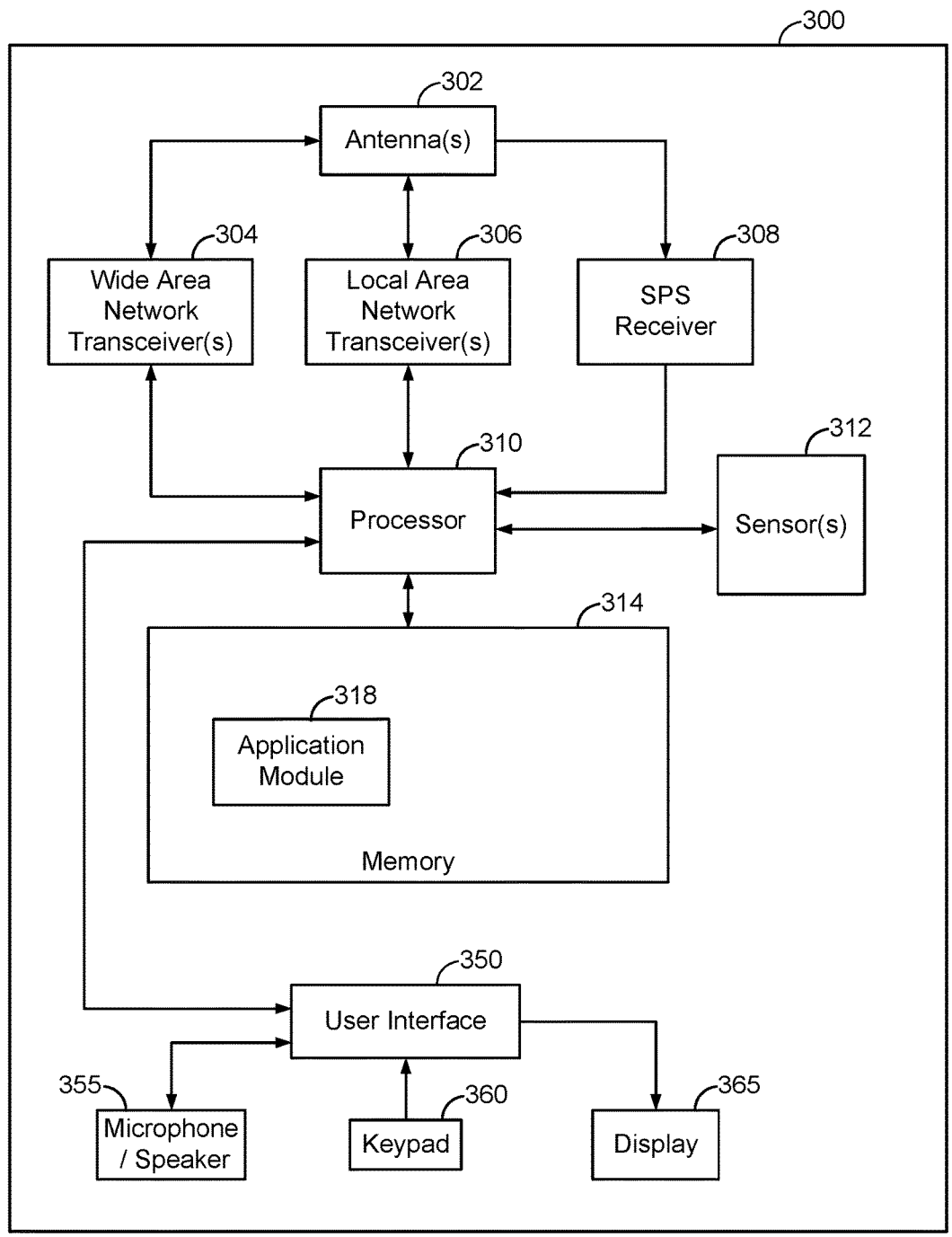
FIG. 3 is a functional block diagram of an example computing device that can be used to implement the techniques disclosed herein.

FIG. 3 is a functional block diagram of an example computing device that can be used to implement the computing device 100 illustrated in FIG. 1. FIG. 3 is a schematic diagram illustrating various components of an example computing device 300, which may be similar to or the same as the computing device 100 depicted in FIG. 1. For the sake of simplicity, the various features/components/functions illustrated in the schematic boxes of FIG. 3 are connected together using a common bus to represent that these various features/components/functions are operatively coupled together. Other connections, mechanisms, features, functions, or the like, may be provided and adapted as necessary to operatively couple and configure a portable wireless device. Furthermore, one or more of the features or functions illustrated in the example of FIG. 3 may be further subdivided, or two or more of the features or functions illustrated in FIG. 3 may be combined. Additionally, one or more of the features or functions illustrated in FIG. 3 may be excluded.

As shown, the computing device 300 may include one or more local area network transceivers 306 that may be connected to one or more antennas 302. The one or more local area network transceivers 306 comprise suitable devices, circuits, hardware, and/or software for communicating with and/or detecting signals to/from one or more of the WLAN access points, and/or directly with other wireless devices within a network. In some embodiments, the local area network transceiver(s) 306 may comprise a WiFi (802.11x) communication transceiver suitable for communicating with one or more wireless access points; however, in some embodiments, the local area network transceiver(s) 306 may be configured to communicate with other types of local area networks, personal area networks (e.g., Bluetooth® wireless technology networks), etc. Additionally, any other type of wireless networking technologies may be used, for example, Ultra Wide Band, ZigBee, wireless USB, etc.

The computing device 300 may also include, in some implementations, one or more wide area network transceiver(s) 304 that may be connected to the one or more antennas 302. The wide area network transceiver 304 may comprise suitable devices, circuits, hardware, and/or software for communicating with and/or detecting signals from one or more of, for example, the WWAN access points and/or directly with other wireless devices within a network. In some implementations, the wide area network transceiver(s) 304 may comprise a CDMA communication system suitable for communicating with a CDMA network of wireless base stations. In some implementations, the wireless communication system may comprise other types of cellular telephony networks, such as, for example, TDMA, GSM, WCDMA, LTE etc. Additionally, any other type of wireless networking technologies may be used, including, for example, WiMax (802.16), etc.

In some embodiments, an SPS receiver (also referred to as a global navigation satellite system (GNSS) receiver) 308 may also be included with the computing device 300. The SPS receiver 308 may be connected to the one or more antennas 302 for receiving satellite signals. The SPS receiver 308 may comprise any suitable hardware and/or software for receiving and processing SPS signals. The SPS receiver 308 may request information as appropriate from the other systems, and may perform the computations necessary to determine the position of the computing device 300 using, in part, measurements obtained by any suitable SPS procedure.

As further illustrated in FIG. 3, the example computing device 300 includes one or more sensors 312 coupled to a controller/processor 310. For example, the sensors 312 may include motion sensors to provide relative movement and/or orientation information (which is independent of motion data derived from signals received by the wide area network transceiver(s) 304, the local area network transceiver(s) 306, and/or the SPS receiver 308). By way of example but not limitation, the motion sensors may include an accelerometer, a gyroscope, and a geomagnetic (magnetometer) sensor (e.g., a compass), any of which may be implemented based on micro-electro-mechanical-system (MEMS), or based on some other technology. The one or more sensors 312 may further include, a thermometer (e.g., a thermistor), an audio sensor (e.g., a microphone) and/or other sensors. The one or more sensors 312 may also include a camera (e.g., a charge-couple device (CCD)-type camera, a CMOS-based image sensor, etc.), which may produce still or moving images (e.g., a video sequence) that may be displayed on a user interface device, such as a display or a screen, and that may be further used to determine an ambient level of illumination and/or information related to colors and existence and levels of UV and/or infra-red illumination.

The processor(s) (also referred to as a controller) 310 may be connected to the local area network transceiver(s) 306, the wide area network transceiver(s) 304, the SPS receiver 308 and the one or more sensors 312. The processor may include one or more microprocessors, microcontrollers, and/or digital signal processors that provide processing functions, as well as other calculation and control functionality. The processor 310 may be coupled to storage media (e.g., memory) 314 for storing data and software instructions for executing programmed functionality within the mobile device. The memory 314 may be on-board the processor 310 (e.g., within the same IC package), and/or the memory may be external memory to the processor and functionally coupled over a data bus.

A number of software modules and data tables may reside in memory 314 and may be utilized by the processor 310 in order to manage both communications with remote devices/nodes, perform positioning determination functionality, and/or perform device control functionality. As illustrated in FIG. 3, in some embodiments, the memory 314 may include an application module 318 which can implement one or more applications. It is to be noted that the functionality of the modules and/or data structures may be combined, separated, and/or be structured in different ways depending upon the implementation of the computing device 300.

The application module 318 may be a process or thread running on the processor 310 of the computing device 300, which may request data from one or more other modules (not shown) of the computing device 300. Applications typically run within an upper layer of the software architectures and may be implemented in a rich execution environment of the computing device 300, and may include indoor navigation applications, shopping applications, location aware service applications, etc.

The computing device 300 may further include a user interface 350 providing suitable interface systems, such as a microphone/speaker 355, a keypad 360, and a display 365 that allows user interaction with the computing device 300. The microphone/speaker 355 (which may be the same or different from the audio sensor) provides for voice communication services (e.g., using the wide area network transceiver(s) 304 and/or the local area network transceiver(s) 306). The keypad 360 may comprise suitable buttons for user input. The display 365 may include a suitable display, such as, for example, a backlit LCD display, and may further include a touch screen display for additional user input modes.

Figure 4:
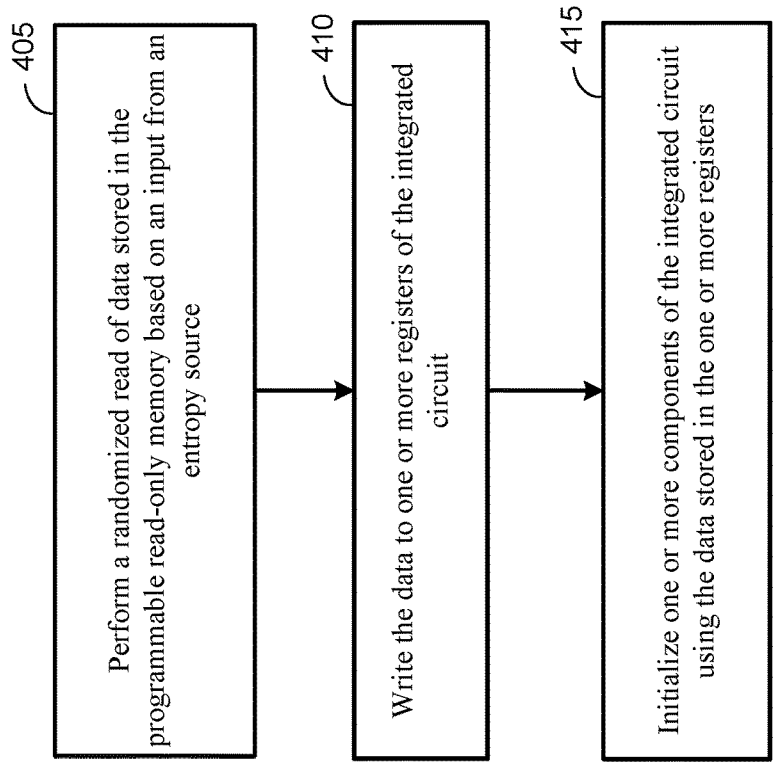
FIG. 4 is a flow diagram of an example process for preventing tampering with programmable read-only memory of an integrated circuit according to the techniques disclosed herein.

FIG. 4 is a flow diagram of an example process for preventing tampering with programmable read-only memory of an integrated circuit according to the techniques disclosed herein. The process illustrated in FIG. 4 can be implemented by the processor 115 of the integrated circuit 110 of the computing device 100 and/or the PROM controller 240. As discussed above, in some implementations of the integrated circuit 110, the PROM controller 240 can be configured to be triggered to begin reading data from the PROM 130 by a free-running clock signal which also can trigger the entropy sources 145 to begin operating without involving the processor 115.

A randomized read of data stored in a programmable read-only memory of an integrated circuit can be performed based on an input from an entropy source (stage 405). The PROM 130 of the integrated circuit 110 can be used to store data that one or more components of the integrated circuit 110 can use when the integrated circuit 110 is booted up or initialized. The data read from the PROM 130 can include cryptographic keys, life-cycle management states, calibrations, configuration data, and other information that may be used by one or more components of the integrated circuit. For example, the integrated circuit may include one or more sensors that require calibration data to function properly. Randomization can be introduced into the read of the data from the PROM 130 to make it more difficult for an attacker from being able to reliably use fault-injection or other types of attacks on integrated circuit 110. Temporal randomness and/or random permutations of the order in which the data is read from the PROM 130 can be introduced in order to prevent fault-injection and other such attacks against the integrated circuit 110 from being deterministically reproducible. Temporal randomness can be added by introducing one or more time delays in the reading of the data from the PROM 130. The time delays can each be of a random length. The length of each delay can be randomly determined using an input from the one or more entropy sources 145 of the integrated circuit 110. The order in which the data is read from the PROM 130 can also be randomly permuted. The order in which the data is read can be determined based at least in part on an input from the one or more entropy sources 145. The PROM controller 240 can be configured to perform the randomized read of the data from the PROM 130. In some implementations, the PROM controller 240 can be triggered to perform the read by the processor 115 of the integrated circuit 110. In other implementations, the processor 115 is not involved, as discussed above.

The data can be written to one or more registers of the integrated circuit (stage 410). Data that has been read from the PROM 130 can be written to one or more of the registers 135 of the integrated circuit 110. These registers have also been referred to herein as "sense registers" because they are used to store data that is sensed or read from the PROM 130 at the time that the integrated circuit 110 is booted up. The PROM controller 240 can be configured to read the data from the PROM 130 and to write the data to the registers 135.

One or more components of the integrated circuit can be initialized using the data stored in the one or more registers (stage 415). The integrated circuit 110 can include one or more components that rely on configuration data, calibration data, or other data stored in the PROM 130. Once the data has been read from the PROM 130 and stored in the one or more registers 135, the processor 115 can signal the one or more components of the integrated circuit 110 to read the data in one or more registers 135 and to initialize the operation of the one or more components. The one or more components can comprise sensors and/or other components of the integrated circuit 110 that require calibration data, configuration data, and/or other such data prior to being initialized.

Figure 5:
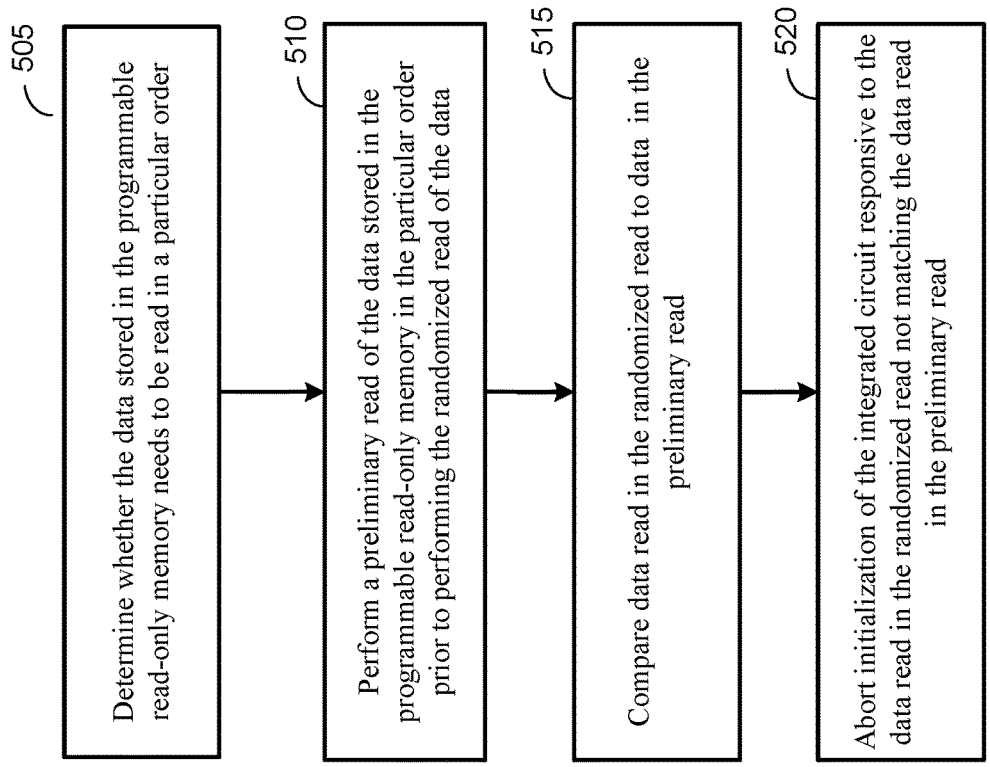
FIG. 5 is a flow diagram of an example process for reading data from a programmable read-only memory according to the techniques disclosed herein.

FIG. 5 is a flow diagram of an example process for reading data from a programmable read-only memory according to the techniques disclosed herein. The process illustrated in FIG. 5 can be implemented by the processor 115 of the integrated circuit 110 of the computing device 100 and/or the PROM controller 240. As discussed above, in some implementations of the integrated circuit 110, the PROM controller 240 can be configured to be triggered to begin reading data from the PROM 130 by a free-running clock signal which also can trigger the one or more entropy sources 145 to begin operating without involving the processor 115.

The process illustrated in FIG. 5 can be a standalone process or can be added on to the process illustrated in FIG. 4. The process illustrated in FIG. 5 can be used where the PROM 130 stores that data needs to be read in a particular order and where a randomized read of the data in the PROM 130 is not suitable. The randomized reading of the data from the PROM 130 may not be suitable for some configurations of the integrated circuit 110 where the integrated circuit requires that data be read from the PROM 130 in a particular order in order to initialize the integrated circuit 110 after reset or doing a boot of the device. Where the data from the PROM 130 must be read in a particular order, a preliminary read of the data can be performed, which is followed by a subsequent randomized read of the data from the PROM 130. The data from the two reads can be compared to ensure that the data is identical from both reads from the PROM 130 to ensure that no tampering occurring with the PROM sensing.

A determination can be made whether the data stored in the programmable read-only memory needs to be read in a particular order (stage 505). The data stored in the PROM 130 can include a sensing order indicator that indicates whether the data can be read in a randomized order as illustrated in FIG. 4, or whether the data needs to be read in a particular order when initializing the components of the integrated circuit 110. The sensing order indicator can be set in the PROM 130 when configuration data is written to the PROM 130, such as when the computing device 100 is configured or provisioned by a service provider or when a firmware update is installed on the integrated circuit 110. Where a sensing order indicator is used, the PROM 130 may be sensed in multiple reads in which the first read is performed in a non-random order so that sensing order indicator can be read. The first read can then be followed by one or more subsequent randomized reads. The sensing order indicator can be stored with an authentication tag that provides integrity protection for the sensing order indicator. The authentication can be provided using a message authentication code (MAC) or other type of authentication tag that can be used to verify that the sensing order indicator has not been tampered with by an attacker or otherwise corrupted. The processor 115 of the integrated circuit 110 can be configured to verify the integrity of the sensing order indicator prior to utilizing the sensing order indicator, and can be configured to halt the sensing of the data in the PROM 130 responsive to determining that the integrity of the processor 115 of the integrated circuit 110 appearing to have been compromised.

A preliminary read of the data stored in the programmable read-only memory can be performed in the particular order prior to performing the randomized read of the data (stage 510). Where the sensing order indicator indicates that the data needs to be read in a particular order, the order in which the data must be read can be specified in the sensing order indicator. The PROM controller 240 can be configured to read the data from the PROM 130 in the order specified by the sensing order indicator.

The data read in the randomized read can be compared to the data in the preliminary read (stage 515). The data from the two reads of the PROM 130 can be compared to ensure that the data from the preliminary read and the data from the randomized read are identical. In some implementations, the comparison of the data read in the randomized read and the data read in the preliminary read are compared after both of the reads have been completed. In other implementations, the comparison of the data read in the randomized read can be compared to the data from the preliminary read as the data in the randomized read is read.

Initialization of the integrated circuit can be aborted responsive to the data read in the randomized read not matching the data read in the preliminary read (stage 520). The processor 115 can be configured to halt the boot or reset process if the two reads do not match and/or to restart the boot or reset process if the data read in the two reads does not match. Other actions can also be taken in addition to or instead of these actions in response to a mismatch. A mismatch may indicate that an attacker has attempted to tamper with the PROM data in an attempt to gain control of or to alter the behavior of the integrated circuit 110.

FIG. 6 is a flow diagram of an example process for generating at least one pseudo-random value using an entropy source according to the techniques disclosed herein.

The process illustrated in FIG. 6 can be implemented by the entropy sources 145. The process illustrated in FIG. 6 can be used to implement at least in part stage 405 of the process illustrated in FIG. 4 where a randomized read of the data stored in the PROM 130 is performed.

At least one pseudo-random value can be generated using an entropy source (stage 605). The at least one pseudo-random value generated by the entropy sources 145 can be used to introduce randomness in the order in which the data is read from the PROM 130. The one or more entropy sources 145 can be configured to output the at least one pseudo-random value and the PROM controller 240 can be configured to receive the at least one pseudo-random value and to use the at least one pseudo-random value to permute the order in which the data is read from the PROM 130 and/or to introduce time delays of vary lengths between data reads to prevent attacks against the integrated circuit 110 during the PROM sensing process from being deterministically reproducible.

FIG. 7 is a flow diagram of an example process for generating at least one pseudo-random value using an alternating step generator according to the techniques disclosed herein. The process illustrated in FIG. 7 can be used to implement at least in part stage 405 of the process illustrated in FIG. 4 and/or stage 605 of the process illustrated in FIG. 6. The process illustrated in FIG. 7 can be implemented by the ASG 220 illustrated in FIG. 2.

The alternating step generator (ASG 220) can be seeded with a default value of uninitialized logic (stage 705). The ASG 220 is seeded in a way that guarantees that the ASG 220 starts from a non-zero, non-predictable state. For example, the seed may be obtained from some resettable flip-flops, which provide the non-zero property, and from some non-resettable flip-flops, which provide the non-predictable property. The seed value can be generated by the default value of uninitialized logic components of the integrated circuit 110. In the example entropy source 200 illustrated in FIG. 2, the PUD 210 provides the seed value for the ASG 220. The initial state of the PUD 210 is determined by the plurality of LFSRs 212 of the PUD 210. The PUD 210 outputs a reset signal until the comparator unit 214 determines that the LFSRs reach a predetermined state represented by the comparator values 216.

The ASG 220 moves forward for the duration of and beyond the PUD 210 activity (stage 710). The LFSRs 212 of the PUD 210 are configured to a new state with each clock cycle until the LFSRs 212 reach the predetermined state represented by the comparator values 216. The PUD 210 asserts a long reset signal during the convergence phase of the LFSRs 212 to provide the reset signal time to propagate correctly to the downstream logic. The PUD 210 can also generate a short reset pulse which can trigger at the same time that the long reset signal but is of a shorter duration. The short reset signal can trigger the ASG 220 to start moving forward during the long pulse. The LFSRs 222 of the ASG 220 similarly continue to move to a new state with each clock cycle. The output of the LFSRs 222 continues to be provided to the biasing generator 224 at each clock cycle and the biasing generator 224 can be configured to generate a clock delay based on the output of the LFSRs 222, which can cause the PROM controller 240 to delay in selecting the next granule of data from the PROM 130.

FIG. 8 is a flow diagram of an example process for generating at least one pseudo-random value using an alternating step generator according to the techniques disclosed herein. The process illustrated in FIG. 8 can be used to implement at least in part stage 405 of the process illustrated in FIG. 4 and/or stage 605 of the process illustrated in FIG. 6. The process illustrated in FIG. 8 can be implemented by the ASG 220 illustrated in FIG. 2.

At least one pseudo-random value can be generated using the alternating step generator (stage 805). As discussed above, the ASG 220 can be configured to generate at least one pseudo-random value that can be used by the PROM controller 240 to introduce a permutation into the order in which the granules of data are sensed from the PROM 130 and/or be used to introduce a delay during and/or between one or more reads of the data from the PROM 130. In the example entropy source 200, the output of the LFSRs 222 of the ASG 220 provides a random value for permuting the order in which the PROM controller 240 selects the data from the PROM 130 and the output from the biasing generator 224 introduces randomness in the clock cycle to introduce randomness in when the next granule of data is read from the PROM 130.

Figure 9:
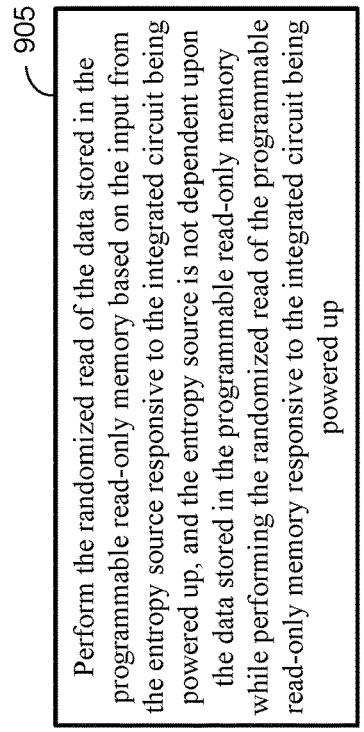
FIG. 9 is a flow diagram of an example process for performing a randomized read of the data stored in the programmable read-only memory according to the techniques disclosed herein.

FIG. 9 is a flow diagram of an example process for performing a randomized read of the data stored in the programmable read-only memory according to the techniques disclosed herein. The process illustrated in FIG. 9 can be used to implement at least in part stage 405 of the process illustrated in FIG. 4. The process illustrated in FIG. 9 can be implemented by the processor 115 and/or the PROM controller 240. As discussed above, in some implementations of the integrated circuit 110, the PROM controller 240 can be configured to be triggered to begin reading data from the PROM 130 by a free-running clock signal which also can trigger the one or more entropy sources 145 to begin operating without involving the processor 115.

The randomized read of the data stored in the programmable read-only memory based on the input from the entropy source can be performed responsive to the integrated circuit being powered up where entropy source is not dependent upon the data stored in the programmable read-only memory while performing the randomized read of the programmable read-only memory responsive to the integrated circuit being powered up (stage 905). The entropy source used to introduce randomness into the process of sensing the data stored in the PROM 130 can be configured such that the entropy source does not require any configuration data, calibration data, or other information from the PROM 130 in order to initialize the entropy source. The entropy source 200 illustrated in FIG. 2 provides an example of such an entropy source. However, the entropy source is not limited to the specific configuration of entropy source 200, and the entropy source can instead utilize other components capable of generating a pseudo-random or random value without requiring configuration data, calibration data, or other information from the PROM 130 in order to initialize the entropy source.

Figure 10:
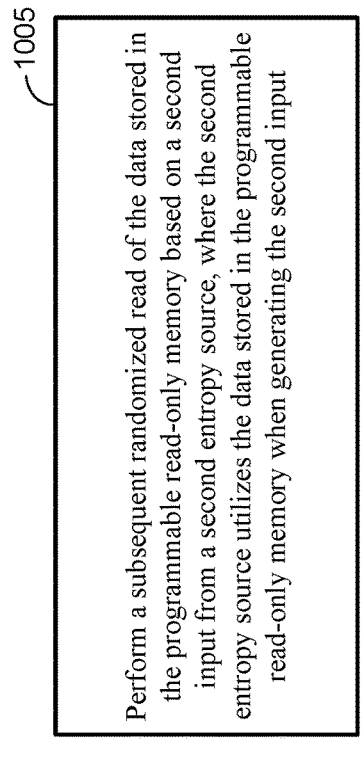
FIG. 10 is a flow diagram of an example process for performing a subsequent randomized read of the data stored in the programmable read-only memory according to the techniques disclosed herein.

FIG. 10 is a flow diagram of an example process for performing a subsequent randomized read of the data stored in the programmable read-only memory according to the techniques disclosed herein. The process illustrated in FIG. 10 can be used to implement additional stages of the process illustrated in FIG. 4. The process illustrated in FIG. 10 can be implemented by the processor 115 and/or the PROM controller 240 and the one or more entropy sources 145. As discussed above, in some implementations of the integrated circuit 110, the PROM controller 240 can be configured to be triggered to begin reading data from the PROM 130 by a free-running clock signal which also can trigger the one or more entropy sources 145 to begin operating without involving the processor 115.

Once an initial read of the data stored in the PROM 130 has been performed, a secondary entropy source that requires configuration data, calibration data, and/or other information stored in the PROM 130 can be utilized to generate entropy in addition to the one or more entropy sources 145 that was initially used to generate the entropy but did not require any such configuration data, calibration data, and/or other information stored in the PROM 130. For example, the secondary entropy source may include a random number generator. A true random number generated may require software calibration and/or time to build up entropy before the random number generated can be used to reliably output random numbers. Such a random number generated may be included as secondary entropy source which can be used for subsequent reads of the data stored in the PROM 130 once the necessary calibration or configuration data has already been read from the PROM 130 and/or sufficient time has elapse to allow the random number generator to build up sufficient entropy to be usable as an entropy source for subsequent reads of the data from the PROM 130. The secondary entropy source can provide a random number input to the PROM controller 240 which the PROM controller 240 can use for permuting the order in which the granules of data stored therein are selected. The secondary entropy source can also be configured to provide a clock bias that can be used to introduce a delay in between reads of data from the PROM 130.

A subsequent randomized read of the data stored in the programmable read-only memory can be performed based on a second input from a second entropy source, where the second entropy source utilizes the data stored in the programmable read-only memory when generating the second input (stage 405). Subsequent reads of the data from the PROM 130 may be necessary to obtain information to perform some task for program code being executed by the processor 115 and/or to calibrate or initialize some component of the integrated circuit 110. These subsequent reads of the data from the PROM 130 can be randomized and can use entropy inputs from the secondary entropy source and/or the primary entropy source to determine the order and the timing of the reads from the PROM 130.

Figure 11:
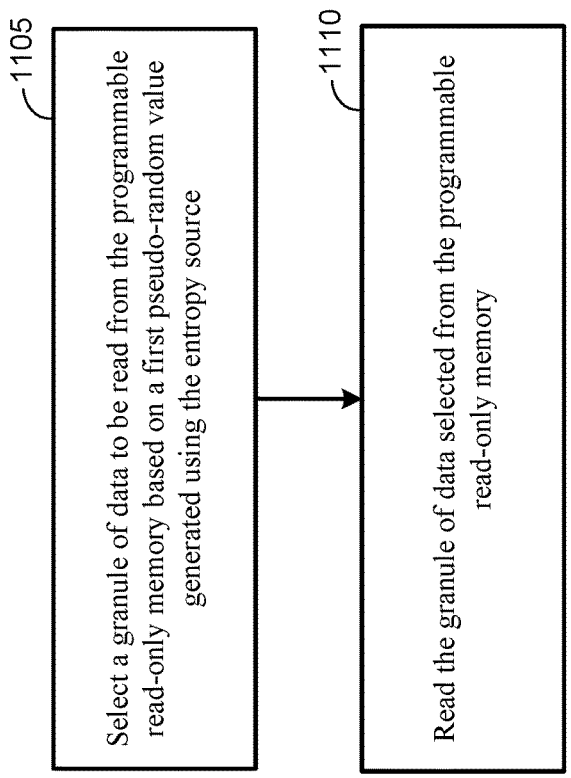
FIG. 11 is a flow diagram of an example process for performing a randomized read of the data stored in the programmable read-only memory according to the techniques disclosed herein according to the techniques disclosed herein.

FIG. 11 is a flow diagram of an example process for performing a randomized read of the data stored in the programmable read-only memory according to the techniques disclosed herein according to the techniques disclosed herein. The process illustrated in FIG. 11 can be used to implement, at least in part, stage 405 of the process illustrated in FIG. 4. The process illustrated in FIG. 11 can be implemented by the processor 115 or the PROM controller 240.

A granule of data to be read from the programmable read-only memory can be selected based on a first pseudo-random value generated using the entropy source (stage 1105). A pseudo-random or random output by the one or more entropy sources 145 or the secondary entropy source (discussed above) can be used to permute the order in which the granules of data are read from the PROM 130. For example, the ASG 220 of the entropy source 200 can generate a pseudo-random number output that can be used by the PROM controller 240 to determine which granule of data which has not yet been read to select to be read. A secondary entropy source, such as a true random number generator, can also be used that may require configuration or calibration data that is stored in the PROM 130 to initialize the secondary entropy source. Such a secondary entropy source can be used to introduce entropy into a read of the PROM 130 once the data has been read from the PROM 130 at least once so and the data required to configure or calibrate the secondary entropy source has already been read.

The granule of data selected can be read from the programmable read-only memory (stage 1110). The granule of data that has been selected can be read from the PROM 130. The data may be written to a register of the one or more registers 135 of the integrated circuit 110. The PROM controller 240 can be configured to read the selected granule of data from the PROM 130.

Figure 12:
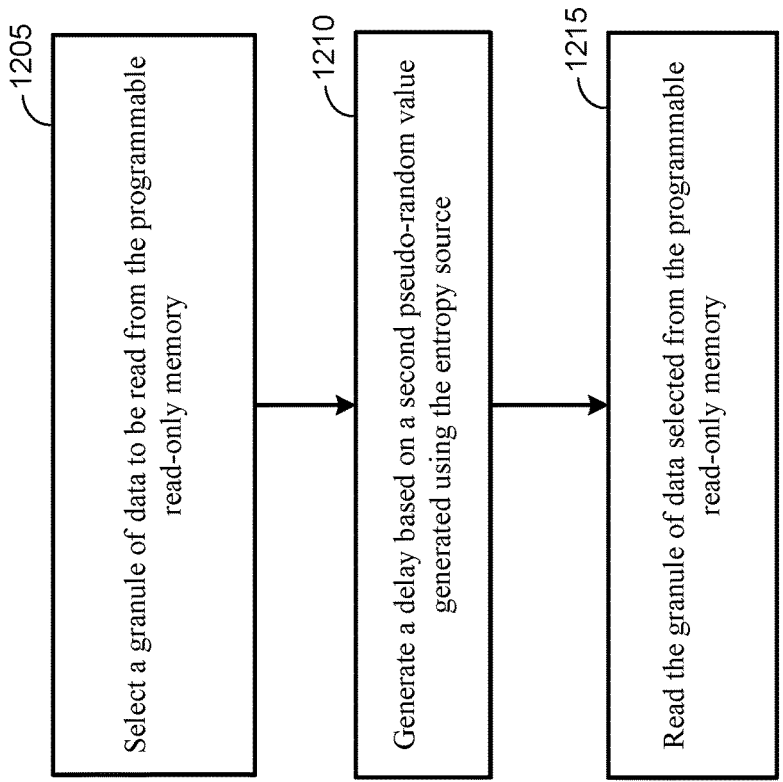
FIG. 12 is a flow diagram of an example process for performing a randomized read of the data stored in the programmable read-only memory according to the techniques disclosed herein according to the techniques disclosed herein.

FIG. 12 is a flow diagram of an example process for performing a randomized read of the data stored in the programmable read-only memory according to the techniques disclosed herein. The process illustrated in FIG. 11 can be used to implement, at least in part, stage 405 of the process illustrated in FIG. 4. The process illustrated in FIG. 11 can be implemented by the processor 115 or the PROM controller 240.

A granule of data to be read from the programmable read-only memory can be selected (stage 1205). The granule of data may be sequentially selected or may be selected using other means. The granule of data does not, however, have to be selected randomly as in the other techniques discussed herein. The PROM controller 240 can be configured to select the granule of data to be read from the PROM 130.

A delay can be determined based on a second pseudo-random value generated using the entropy source (stage 1210). The entropy source can be used to generate a signal that can be used to determine how long of a delay should be inserted prior to reading the selected granule of data from the PROM 130. The delay can vary in length and may be bound by a minimum delay value and a maximum delay value. The minimum delay value can be zero or no delay. Both the minimum and the maximum delay values can be defined as a number of clock cycles. The minimum and maximum delay values can vary depending on the implementation of the one or more entropy sources 145. In the example implementation of the entropy source 200, the delay depends upon the output of the PUD 210 and the ASG 220 as discussed above. In other implementations, the delay can be imparted by other types of entropy sources in addition to or instead of the entropy source 200.

The selected granule of data can be read from the programmable read-only memory (stage 1215). The PROM controller 240 can be configured to read the selected granule of data from the PROM 130. In the example entropy source 200, the PUD 210 and the ASG 220 are configured to introduce delays in the clock signal that controls when the PROM controller 240 reads the data from the PROM 130. A read may take one or more clock cycles, and stage 1210 may be repeated multiple times to introduce a delay or delays into the read performed by the PROM controller 240.

FIG. 13 is a flow diagram of an example process for performing a randomized read of the data stored in the programmable read-only memory according to the techniques disclosed herein according to the techniques disclosed herein. The process illustrated in FIG. 11 can be used to implement, at least in part, stage 405 of the process illustrated in FIG. 4. The process illustrated in FIG. 11 can be implemented by the processor 115 or the PROM controller 240.

A granule of data to be read from the programmable read-only memory can be selected based on a first pseudo-random value generated using the entropy source (stage 1305). A pseudo-random or random output by the one or more entropy sources 145 or the secondary entropy source (discussed above) can be used to permute the order in which the granules of data are read from the PROM 130. For example, the ASG 220 of the entropy source 200 can generate a pseudo-random number output that can be used by the PROM controller 240 to determine which granule of data which has not yet been read to select to be read. Where the PROM 130 has already been read at least once and a secondary entropy source may also be used, such as a true random number generator, which can require configuration or calibration data that is stored in the PROM 130 to initialize such an entropy source.

A delay can be determined based on a second pseudo-random value generated using the entropy source (stage 1310). The entropy source can be used to generate a signal that can be used to determine how long of a delay should be inserted prior to reading the selected granule of data from the PROM 130. The delay can vary in length and may be bound by a minimum delay value and a maximum delay value. The minimum delay value can be zero or no delay. Both the minimum and the maximum delay values can be defined as a number of clock cycles. The minimum and maximum delay values can vary depending on the implementation of the one or more entropy sources 145. In the example implementation of the entropy source 200, the delay depends upon the output of the PUD 210 and the ASG 220 as discussed above. In other implementations, the delay can be imparted by other types of entropy sources in addition to or instead of the entropy source 200.

The selected granule of data can be read from the programmable read-only memory (stage 1315). The PROM controller 240 can be configured to read the selected granule of data from the PROM 130. In the example entropy source 200, the PUD 210 and the ASG 220 are configured to introduce delays in the clock signal that controls when the PROM controller 240 reads the data from the PROM 130. A read may take one or more clock cycles, and stage 1310 may be repeated multiple times to introduce a delay or delays into the read performed by the PROM controller 240.

FIG. 14 is a flow diagram of an example process for generating a delay using an alternating step generator according to the techniques disclosed herein. The process illustrated in FIG. 14 can be used to implement, at least in part, stage 1210 of the process illustrated in FIG. 12 and/or stage 1310 of the process illustrated in FIG. 13. The process illustrated in FIG. 14 can be implemented by the ASG 220 illustrated in FIG. 2.

A clock bias value can be generated using an alternating step generator (stage 1405). The entropy sources 140 can include an alternating step generator, such as the ASG 220 included the implementation of the entropy source 200. The ASG 220 can be used to generate a clock bias value based on a pseudo-random output of the ASG 220 that can be used to introduce a delay in the clock input to the PROM controller 240. The introduced delay causes the PROM controller 240 to introduce randomness into the read of the data from the PROM 130 such that the read occurs in a non-deterministic fashion, and an attacker cannot derive any useful information from how long it takes to read a particular granule of data from the PROM 130.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media. Tangible media include one or more physical articles of machine readable media, such as random access memory, magnetic storage, optical storage media, and so on.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Such media also provide examples of non-transitory media, which can be machine readable, and wherein computers are an example of a machine that can read from such non-transitory media.

The generic principles discussed herein may be applied to other implementations without departing from the spirit or scope of the disclosure or claims.

What is claimed is:

1. A method for preventing tampering with programmable read-only memory of an integrated circuit, the method comprising:
   determining whether data stored in the programmable read-only memory needs to be read in a particular order;
   performing a preliminary read of the data stored in the programmable read-only memory in the particular order;
   performing a randomized read of data stored in the programmable read-only memory based on an input from an entropy source;
   comparing data read in the randomized read to the data read in the preliminary read;
   aborting initialization of the integrated circuit responsive to the data read in the randomized read not matching the data read in the preliminary read; and
   writing the data to one or more registers of the integrated circuit and initializing one or more components of the integrated circuit using the data stored in the one or more registers responsive to the data read in the randomized read matching the data read in the preliminary read.

2. The method of claim 1, further comprising:
generating at least one pseudo-random value using the entropy source.

3. The method of claim 2, wherein the entropy source comprises a default value of uninitialized logic.

4. The method of claim 3, wherein the uninitialized logic comprises a plurality of non-resettable flip-flops.

5. The method of claim 2, wherein the entropy source further comprises a mechanism to compensate for process biasing.

6. The method of claim 5, wherein the mechanism comprises an Linear-feedback shift register (LFSR)-based power up detector associated with an alternating step generator.

7. The method of claim 6, further comprising:
seeding the alternating step generator with at least a default value of uninitialized logic; and
moving forward the alternating step generator for a duration of power-up detector activity.

8. The method of claim 5, further comprising:
generating the at least one pseudo-random value using the alternating step generator.

9. A method for preventing tampering with programmable read-only memory of an integrated circuit, the method comprising:
performing a randomized read of data stored in the programmable read-only memory based on an input from an entropy source responsive to the integrated circuit being powered up, wherein the entropy source is not dependent upon the data stored in the programmable read-only memory while performing the randomized read of the programmable read-only memory responsive to the integrated circuit being powered up;
writing the data to one or more registers of the integrated circuit; and
initializing one or more components of the integrated circuit using the data stored in the one or more registers.

10. A method for preventing tampering with programmable read-only memory of an integrated circuit, the method comprising:
performing a randomized read of data stored in the programmable read-only memory based on an input from an entropy source;
writing the data to one or more registers of the integrated circuit;
initializing one or more components of the integrated circuit using the data stored in the one or more registers; and
performing a subsequent randomized read of the data stored in the programmable read-only memory based on a second input from a second entropy source, wherein the second entropy source utilizes the data stored in the programmable read-only memory when generating the second input.

11. The method of claim 1, wherein performing the randomized read of the data stored in the programmable read-only memory based on the input from the entropy source further comprises:
selecting a granule of data to be read from the programmable read-only memory based on a first pseudo-random value generated using the entropy source; and
reading the granule of data selected from the programmable read-only memory.

12. A method for preventing tampering with programmable read-only memory of an integrated circuit, the method comprising:
performing a randomized read of data stored in the programmable read-only memory based on an input from an entropy source, wherein performing the randomized read of the data stored in the programmable read-only memory based on the input from the entropy source further comprises:
selecting a granule of the data to read from the programmable read-only memory;
generating a delay based on a second pseudo-random value generated using the entropy source; and
reading the granule of the data selected from the programmable read-only memory after the delay has elapsed;
writing the data to one or more registers of the integrated circuit; and
initializing one or more components of the integrated circuit using the data stored in the one or more registers.

13. A method for preventing tampering with programmable read-only memory of an integrated circuit, the method comprising:
performing a randomized read of data stored in the programmable read-only memory based on an input from an entropy source, wherein performing the randomized read of the data stored in the programmable read-only memory based on the input from the entropy source further comprises:
selecting a granule of the data to be read from the programmable read-only memory based on a first pseudo-random value generated using the entropy source;
generating a delay based on a second pseudo-random value generated using the entropy source; and
reading the granule of the data selected from the programmable read-only memory after the delay has elapsed;
writing the data to one or more registers of the integrated circuit; and
initializing one or more components of the integrated circuit using the data stored in the one or more registers.

14. The method of claim 13, wherein generating the delay based on the second pseudo-random value further comprises:
generating a clock bias value using an alternating step generator.

15. An apparatus comprising:
a programmable read-only memory; and
a processor coupled to the programmable read-only memory, the processor configured to:
determine whether data stored in the programmable read-only memory needs to be read in a particular order;
perform a preliminary read of the data stored in the programmable read-only memory in the particular order;
perform a randomized read of data stored in the programmable read-only memory of an integrated circuit based on an input from an entropy source;
compare data read in the randomized read to the data read in the preliminary read; and
abort initialization of the integrated circuit responsive to the data read in the randomized read not matching the data read in the preliminary read; and write the data to one or more registers of the integrated circuit and initialize one or more components of the integrated circuit using the data stored in the one or more registers responsive to the data read in the randomized read matching the data read in the preliminary read.

16. The apparatus of claim 15, wherein the processor is further configured to:
generate at least one pseudo-random value using the entropy source.

17. The apparatus of claim 16, wherein the entropy source comprises a default value of uninitialized logic.

18. The apparatus of claim 17, wherein the uninitialized logic comprises a plurality of non-resettable flip-flops.

19. The apparatus of claim 15, wherein the processor is configured to perform the randomized read of the data stored in the programmable read-only memory based on the input from the entropy source responsive to the integrated circuit being powered up, and wherein the entropy source is not dependent upon the data stored in the programmable read-only memory while performing the randomized read of the programmable read-only memory responsive to the integrated circuit being powered up.

20. The apparatus of claim 15, wherein the processor is configured to perform a subsequent randomized read of the data stored in the programmable read-only memory based on a second input from a second entropy source, and wherein the second entropy source utilizes the data stored in the programmable read-only memory when generating the second input.

21. The apparatus of claim 15, wherein the processor being configured to perform the randomized read of the data stored in the programmable read-only memory based on the input from the entropy source is further configured to:
select a granule of data to be read from the programmable read-only memory based on a first pseudo-random value generated using the entropy source; and
read the granule of data selected from the programmable read-only memory.

22. The apparatus of claim 15, wherein the processor being configured to perform the randomized read of the data stored in the programmable read-only memory based on the input from the entropy source is further configured to:
select a granule of data to read from the programmable read-only memory;
generate a delay based on a second pseudo-random value generated using the entropy source; and
read the granule of data selected from the programmable read-only memory after the delay has elapsed.

23. The apparatus of claim 15, wherein the processor being configured to perform the randomized read of the data stored in the programmable read-only memory based on the input from the entropy source is further configured to:
select a granule of data to be read from the programmable read-only memory based on a first pseudo-random value generated using the entropy source;
generate a delay based on a second pseudo-random value generated using the entropy source; and
read the granule of data selected from the programmable read-only memory after the delay has elapsed.

24. An apparatus comprising:
means for determining whether data stored in programmable read-only memory of an integrated circuit needs to be read in a particular order;
means for performing a preliminary read of the data stored in the programmable read-only memory in the particular order;
means for performing a randomized read of data stored in programmable read-only memory of the integrated circuit based on an input from an entropy source;
means for comparing data read in the randomized read to the data read in the preliminary read;
means for aborting initialization of the integrated circuit responsive to the data read in the randomized read not matching the data read in the preliminary read;
means for writing the data to one or more registers of the integrated circuit and means for initializing one or more components of the integrated circuit using the data stored in the one or more registers responsive to the data read in the randomized read matching the data read in the preliminary read.

25. The apparatus of claim 24, further comprising:
means for generating at least one pseudo-random value using the entropy source.

26. The apparatus of claim 25, wherein the entropy source comprises a default value of uninitialized logic.

27. The apparatus of claim 26, wherein the uninitialized logic comprises a plurality of non-resettable flip-flops.

* * * * *